United States Patent [19]

Hoge et al.

[11] Patent Number: 5,443,220
[45] Date of Patent: Aug. 22, 1995

[54] TAKE-UP REEL FOR MAGNETIC TAPE CARTRIDGE LEADER BLOCK

[75] Inventors: David T. Hoge, Westminster; Michael V. Konshak, Louisville, both of Colo.; George P. Rambosek, Shafer, Minn.

[73] Assignee: Storage Technology Corporation, Louisville, Colo.

[21] Appl. No.: 176,109

[22] Filed: Dec. 30, 1993

[51] Int. Cl.6 .................................................. G11B 15/32
[52] U.S. Cl. ....................................... 242/332.8; 242/587.1
[58] Field of Search ............... 242/332, 332.8, 348, 242/348.2, 600, 613, 614, 587, 587.1, 587.2, 587.3

[56] References Cited

U.S. PATENT DOCUMENTS

| | | | |
|---|---|---|---|
| 4,350,309 | 9/1982 | Richard et al. | 242/613 |
| 4,399,959 | 8/1983 | Godsoe et al. | 242/332.8 |
| 4,608,614 | 8/1986 | Rinkleib et al. | 242/332.8 |
| 4,679,747 | 7/1987 | Smith | 242/332.8 |
| 4,709,873 | 12/1987 | Smith et al. | 242/332.8 |
| 5,261,626 | 11/1993 | Hoge et al. | 242/348.2 |

FOREIGN PATENT DOCUMENTS 0090086 12/1982 European Pat. Off. .

Primary Examiner—Daniel P. Stodola
Assistant Examiner—William A. Rivera
Attorney, Agent, or Firm—Duft, Graziano & Forest

[57] ABSTRACT

The take-up reel is used in conjunction with a leader block that securely fastens the magnetic tape in the leader block such that the magnetic tape exits an aperture at one end of the leader block. The take-up reel accepts this leader block and completely seats it in an aperture contained in the take-up reel hub to ensure that no segment of the leader block protrudes from the take-up reel hub. The top and bottom plates of the take-up reel include guide slots to automatically position and align the leader block that is transported by the tape threading arm from the magnetic tape cartridge.

14 Claims, 4 Drawing Sheets

TAKE-UP REEL FOR MAGNETIC TAPE CARTRIDGE LEADER BLOCK

FIELD OF THE INVENTION

This invention relates to magnetic tape drives and, in particular, to a take-up reel for use with a single reel magnetic tape cartridge having a leader block attached to the magnetic tape.

PROBLEM

It is a problem in the field of tape drives to provide a take-up reel that securely and simply seats the leader block, used to enable withdrawal of the magnetic tape from the magnetic tape cartridge, such that none of the leader block protrudes past the circumference of the hub of the take-up reel. Existing leader blocks are oriented such that the magnetic tape exits from a side of the leader block. The side exit of the tape from the leader block places a strain on the magnetic tape and can interfere with the fit between the leader block and the take-up reel. When such a leader block is fully inserted into the take-up reel, the leader block forms a part of the circumference of the take-up reel hub and thus the magnetic tape winding surface. Any misalignment of the magnetic tape with the leader block or a failure to properly seat the leader block in the take-up reel results in a non-uniform tape winding surface, which causes undesirable impressions in the magnetic tape as it is wrapped on the take-up reel. In addition, special leader block docking mechanisms must be employed in order to smoothly seat the leader block in the take-up reel.

SOLUTION

The above-described problems are solved and a technical advance achieved in the field by the take-up reel of present invention that completely seats the leader block as it is received from the magnetic tape cartridge. This take-up reel is used in conjunction with a leader block that orients the magnetic tape to exit the leader block through one end thereof in order to minimize the strain on the magnetic tape and to avoid undesirable impressions on the magnetic tape as it is wrapped on the take-up reel. The take-up reel of the present invention accepts this leader block and completely seats it in an aperture contained therein to ensure that no segment of the leader block protrudes from the outer circumference of the take-up reel hub.

The take-up reel consists of a substantially cylindrical hub having a top and a bottom to which are concentrically attached substantially cylindrical top and bottom plates, respectively. The hub contains an aperture in its side, extending substantially from its top to its bottom, to seat the leader block. The top and bottom plates include guide slots to automatically position and align the leader block as it is transported by a tape threading arm from the magnetic tape cartridge. A threading pin slot is preferably included in the top plate of the take-up reel to accept the tape threading pin of the tape threading arm and guide it and the attached leader block to its final position within the hub. The distal end of the slots in the top and bottom plates of the take-up reel are preferably tapered to account for any misalignment of the leader block, and to funnel the leader block into the slots in the top and bottom plates of the take-up reel. Similarly, the aperture in the hub is preferably tapered to precisely guide the leader block, once it reaches the end of the guide slots in the top and bottom plates, into precise position in the aperture in the hub. The slot in the top plate preferably extends toward the axis of the take-up reel to enable the tape threading arm threading pin to completely pull the leader block within the circumference of the hub. The dimensions of the aperture in the hub are selected such that no portion of the leader block from which the magnetic tape exits protrudes from the aperture in the hub, and a continuous surface is thus formed with the remainder of the hub to provide a smooth surface on which the magnetic tape is wound.

DETAILED DESCRIPTION

One type of computer system tape transport presently in use makes use of the IBM 3480-type magnetic tape cartridge as the data storage media. The 3480-type magnetic tape cartridge consists of a substantially rectangular exterior housing that contains a single reel of magnetic tape with a leader block affixed to one end of the magnetic tape. The leader block is exposed through an opening in the exterior housing of the magnetic tape cartridge for use by an associated tape drive to retrieve the magnetic tape from the magnetic tape cartridge. A tape threading arm in the tape drive grasps the leader block to extract the magnetic tape through the opening in the one corner of the magnetic tape cartridge and transport the leader block along a tape threading path to be inserted into the take-up reel of the tape drive. The external dimensions and architecture of the 3480type magnetic tape cartridge are an industry standard, as is the tape threading arm threading pin that is used to grasp the leader block.

LEADER BLOCK BODY

Figure 7:
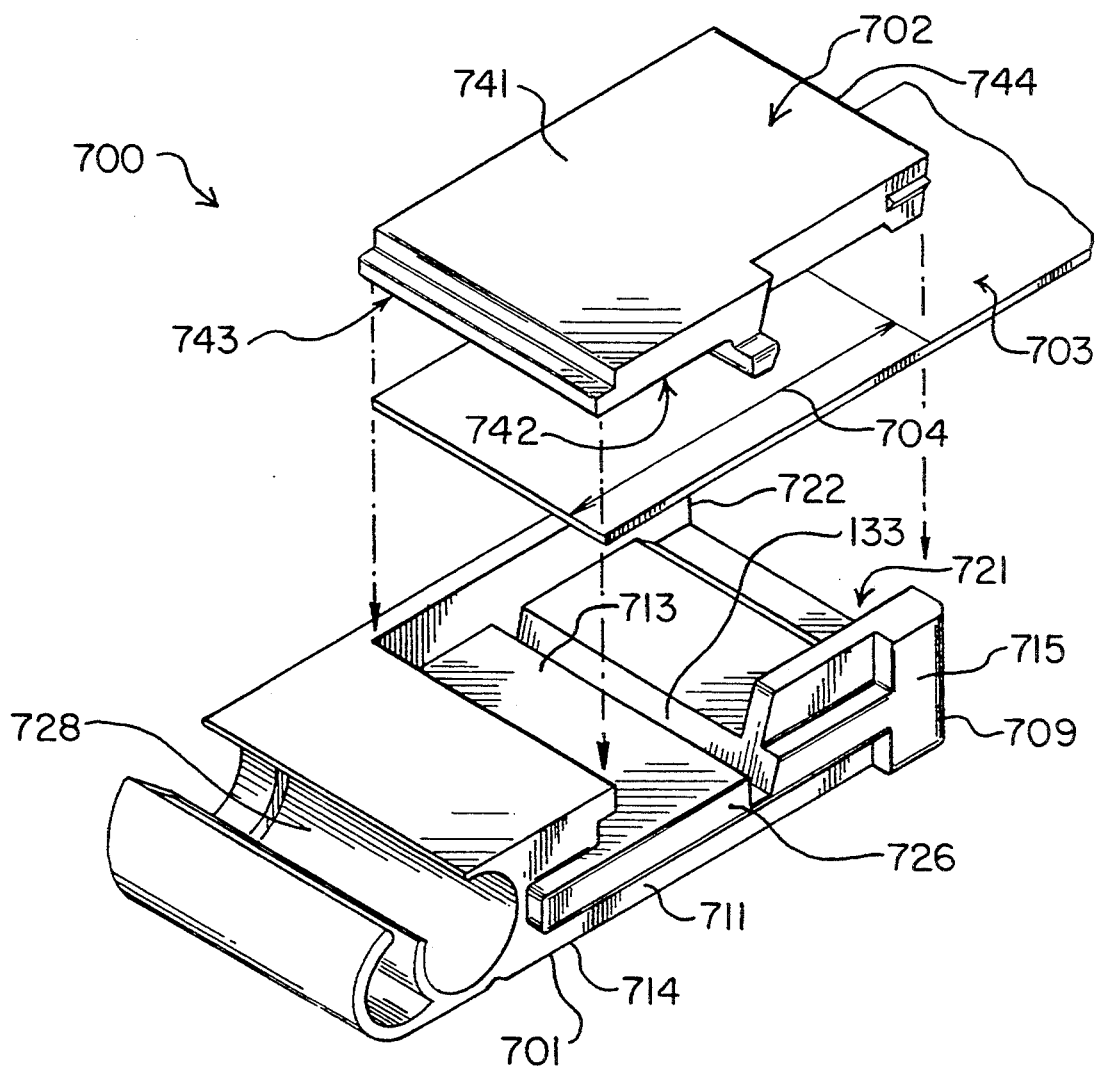
FIG. 7 illustrates in perspective view a leader block that is desirably used in conjunction with the take-up reel of the present invention.

FIG. 7 illustrates an exploded perspective view of the leader block 700 desirably used with the take-up reel 100 (FIG. 1) of the present invention. Leader block 700 consists of a body 701 and a cover 702 which function, when interconnected, to sandwich magnetic tape 703 therebetween in order to securely and precisely fasten leader block 700 to magnetic tape 703. It is critical to the reliable operation of the magnetic tape cartridge to have leader block 700 precisely oriented with respect to magnetic tape 703 and securely fastened thereto. Therefore, leader block 700 must be self aligning with reference to magnetic tape 703 as well as securely fastened thereto. This is accomplished without the use of fasteners or the need for a special assembly mechanism by means of the simple snap fit, self aligning design of leader block 700.

Magnetic tape 703 has a first end 704 which extends through an opening in the magnetic tape cartridge to enable the associated tape drive to extract magnetic tape 703 from the magnetic tape cartridge by means of leader block 700. The body 701 in turn has a top 711, a bottom 712, a front 713, a back 714, a first side 715 and a second side 716. The top 711 and bottom 712 of body 701 include a first tape guide projection 721 and a second tape guide projection 722, respectively, which are extensions of top 711 and bottom 712 that protrude over the front 713 of body 701. First tape guide projection 721, front 713 and second tape guide projection 722 in combination form a substantially U-shaped channel open at one end and adapted to receive the first end 704 of magnetic tape 703. The dimensions of the first tape guide projection 721 and the second tape guide projection 722 are such that the U-shaped channel formed therebetween substantially matches the physical dimensions of the first end 704 of magnetic tape 703. Magnetic tape 703 exits first side 715 of leader block 700 substantially at the centerline of first side 715. This allows the tape threading arm to pull leader block 700 in a straight line with magnetic tape 703. The straight line pull of leader block 700 also provides a narrow cross section profile to the tape threading path and permits the use of a narrower tape threading path than presently used.

ADDITIONAL LEADER BLOCK FEATURES

Leader block 700 also includes a tape threading arm socket 728 located at the second side 716 thereof, which tape threading arm socket 728 is adapted to receive a tape threading arm pin. The tape threading arm socket 728 comprises a substantially semi-cylindrical socket extending from the top 711 of body 701 towards bottom 712 of body 701.

Also included in leader block 700 is a pair of guide projections 709 which function to align leader block 700 with the aperture 107 in hub 106 of the take-up reel 100. Guide projections 709 are located on the top 711 and bottom 712 of body 701 and extend a substantial distance along the length of body 701. As the leader block 700 is guided into position to take-up reel 100, the second side 716 of leader block 700 reaches the guide slots 104, 105 in the take-up reel 100, causing guide projections 709 encounter the edges of guide slots 104, 105 to guide the second side 716 of leader block 700 in a radial direction to aperture 107 in order to enable leader block 700 to seat in the aperture 107 in the take-up reel 100.

Second end 744 of cover 702 is recessed approximately the thickness of magnetic tape 703 from first side 715 of body 701. When the leader block 701 is inserted into the take-up reel 100 of the tape drive, the first side 715 (which may be curved in shape) of leader block 700 forms a part of the outer circumference of the take-up reel and first side 715 is part of the magnetic tape winding surface. Guide projections 709 precisely determine the location of first side 715 in the take-up reel by mating with corresponding notches in the take-up reel 100. The magnetic tape 703 is wrapped first over second end 744 of cover 702 and thence around the take-up reel. When one complete wrap of tape is taken, first side 715 and second end 744 of cover 702 (with one thickness of magnetic tape 703 wrapped over second end 744) form a smooth surface to prevent subsequent wraps of magnetic tape 703 on the take-up reel from having impressions thereon caused by the leader block 700 protruding from the take-up reel 100.

TAKE-UP REEL ARCHITECTURE

Figure 1:
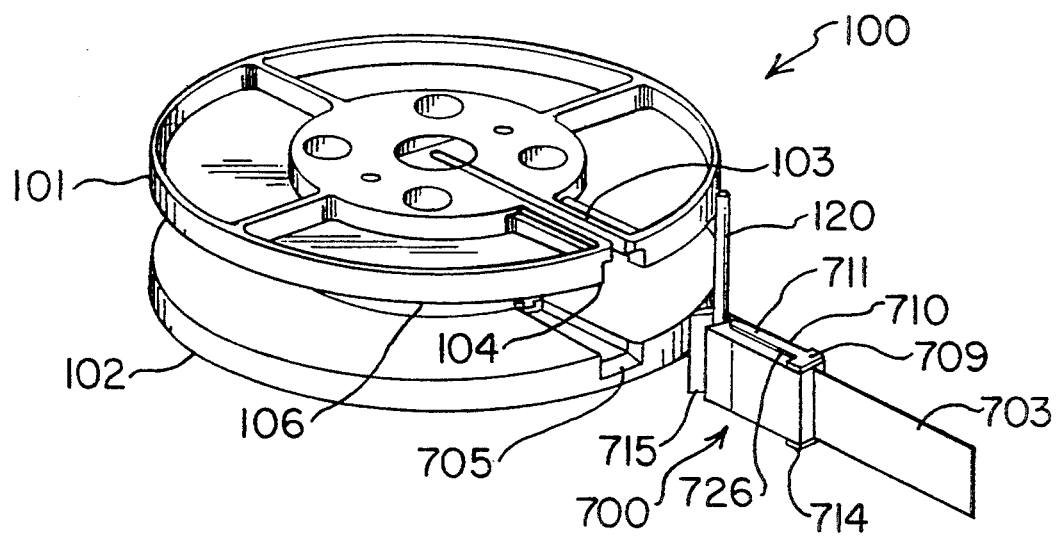
FIG. 1 illustrates in perspective view one embodiment of the take-up reel of the present invention.
Figure 2:
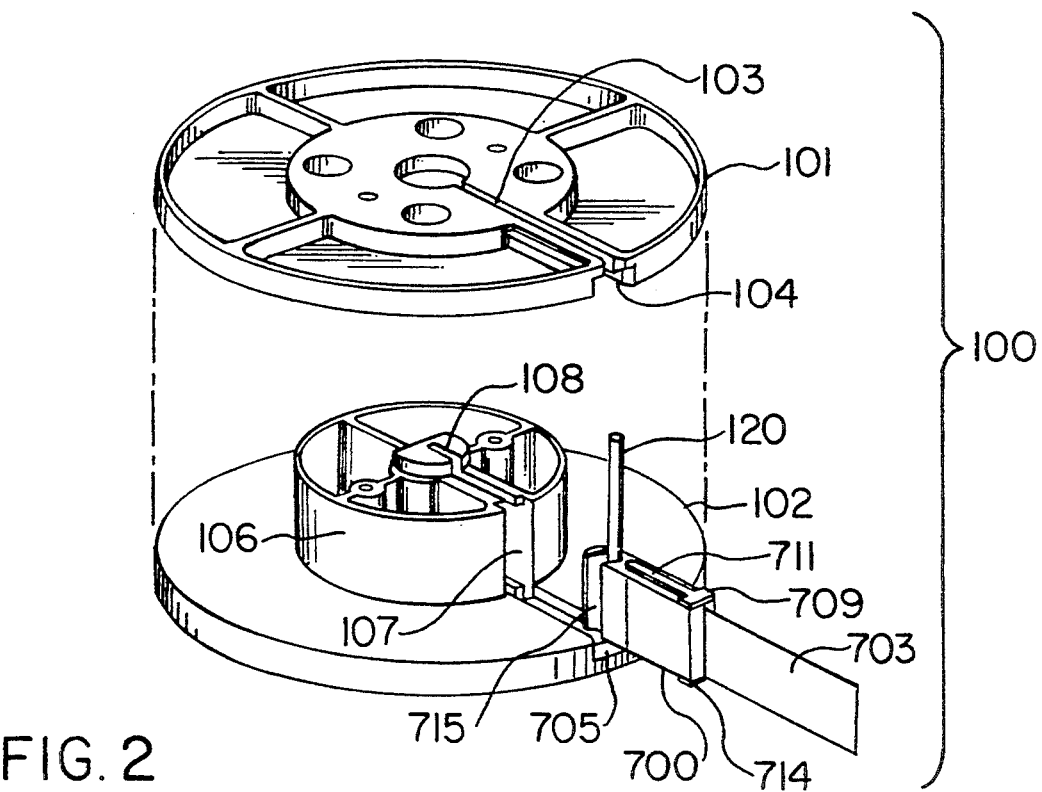
FIG. 2 illustrates in exploded view the take-up reel of FIG. 1.

FIG. 1 illustrates a perspective view of the spool-shaped take-up reel 100 of the present invention, which comprises a substantially cylindrical-shaped hub 106 having a top and bottom to which is affixed a substantially cylindrical top plate 101 and bottom plate 102, respectively, to form the rims of the spool. The combination of the top plate 101, bottom plate 102 and cylindrical hub 106 implements a take-up reel 100 on whose hub 106 the magnetic tape 703 is wound by the action of the take-up reel motor (not shown) in the magnetic tape drive. In order to accommodate the leader block 700 disclosed in FIG. 7, the architecture of the take-up reel 100 differs from that of conventional take-up reels and provides an improved magnetic tape wrap capability. In particular, FIG. 2 illustrates an exploded view of the take-up reel 100 to illustrate the provision of an aperture 107 in the hub 106 that is used to receive the leader block 700 as it is retrieved from the magnetic tape cartridge by the tape threading arm (not shown).

The alignment of the leader block 700 with this aperture 107 is provided by the use of guide slots 104, 105 formed in the interior surfaces of the top plate 101 and the bottom plate 102 of the take-up reel 100. These guide slots 104, 105 serve as leader block alignment guides to engage the leader block 700 and precisely position it for insertion into the aperture 107 of the hub 106. The leader block 700 illustrated in FIG. 7 and in FIGS. 1–6 includes guide projections 709 located on the top side 711 and bottom side 712 thereof, which guide projections 709 include an extended segment 726 to align with the guide slots 104, 105 in the interior surfaces of the top plate 101 and bottom plate 102 of the take-up reel 100. The ends of these guide projections 709 located distal from the magnetic tape aperture on the leader block 700 are shaped in a curvilinear manner to provide a self-compensating capability for the alignment of the leader block 700 with the guide slots 104, 105.

The end of the guide slots 104, 105 in the top 101 and bottom 102 plates of the take-up reel 100 are tapered to compensate for any potential misalignment of the front end of the guide projections 709 on the leader block 700 and the guide slots 104, 105 in the top 101 and bottom 102 plates of the take-up reel 100. Thus, the tapered end of guide slots 104, 105 function as a funnel to capture the extended portion 726 of guide projections 709 located on the top 711 and bottom 712 of the leader block 700 and, as the leader block 700 is moved by the threading pin 120 of the tape threading arm towards the axis 108 of the take-up reel 100, into a more precise position with respect to the aperture 107 in the hub 106 of the take-up reel 100. The guide projections 709 on the top 711 and bottom 712 of the leader block 700 can include a shoulder at one end thereof to limit the range of travel of the leader block 700 into the aperture 107 in the hub 106 of the take-up reel 100. Thus, the funneling effect of the guide slots 104, 105 in the top 101 and bottom 102 plates of the take-up reel 100 function to constrain the lateral movement of the leader block 700 from side to side in the aperture 107.

A stop mechanism is built into the leader block 700 (guide projections 709) to precisely determine the radial location of the leader block 700 in the aperture 107. The guide projections 709 are positioned on the leader block 700 such that the end of the leader block 700 that contains the aperture through which the magnetic tape 703 exits the leader block 700 is placed to be at a radial distance from the axis of the take-up reel 100 that is identical to the radial distance of the exterior circumference of the hub 106 from the axis of the take-up reel 100. Once the leader block 700 is seated in the aperture 107, its one side 715 substantially aligns with the exterior surface of the hub 106 of the take-up reel 100 to form a substantially continuous and smooth uninterrupted surface on which the magnetic tape 703 is wound. Due to the fact that the magnetic tape 703 exits an aperture in the end of the leader block 700 that forms a segment of this continuous uninterrupted hub surface, there are no projections or interruptions in the smooth wrapping of the magnetic tape 703 around the exterior surface of the hub 106. The provision of this smooth substantially continuous surface on which the magnetic tape is wound minimizes the possibility that the magnetic tape can be deformed, torn or otherwise damaged during the tape winding and unwinding process.

ADDITIONAL VIEWS

Figure 3:
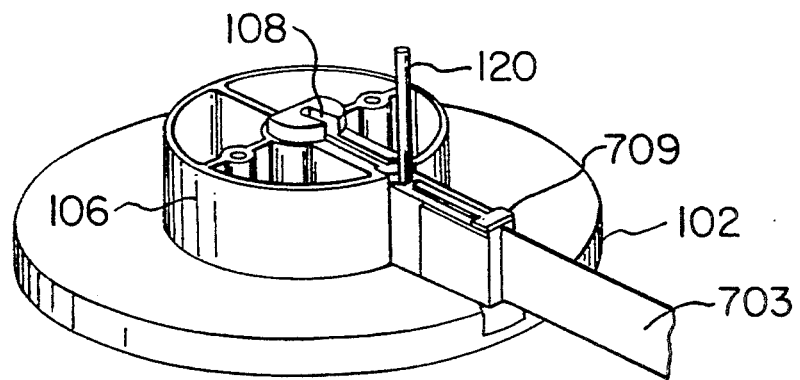
FIGS. 3 and 4 illustrate in perspective views the hub and the bottom plate of the take-up reel of FIG. 1 as a leader block is progressively received therein.
Figure 4:
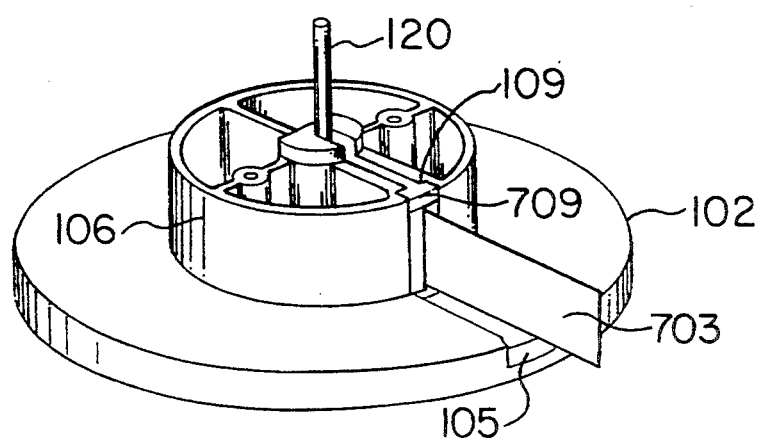
Figure 5:
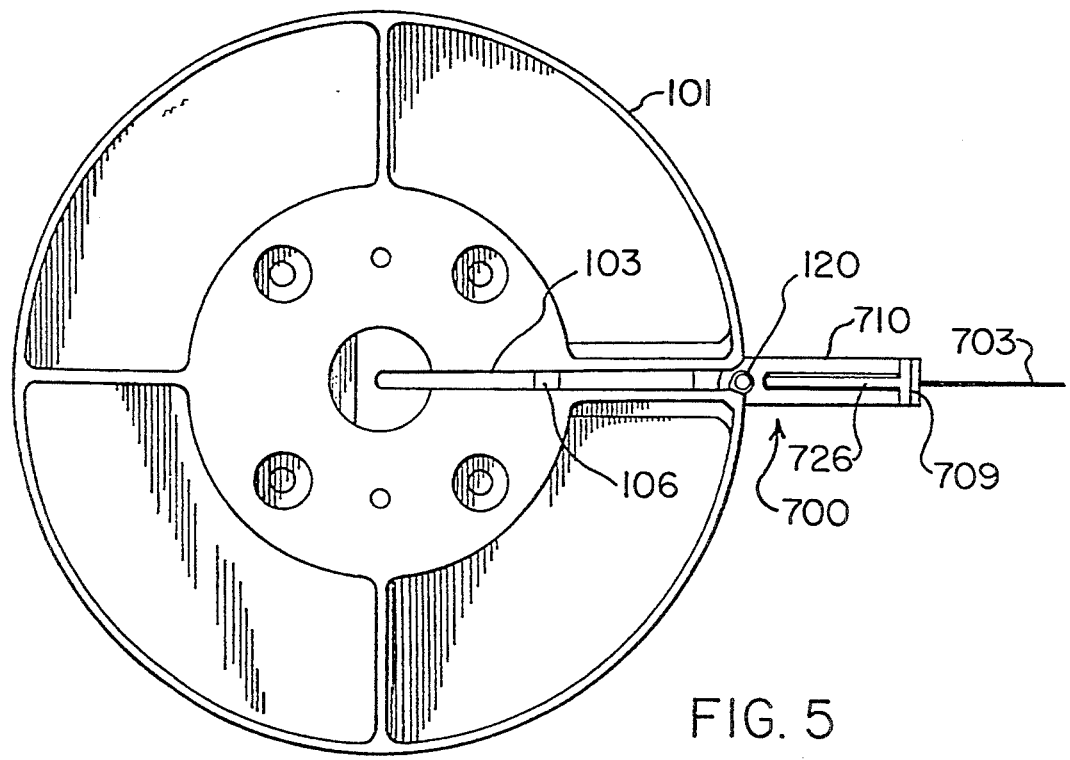
FIGS. 5 and 6 illustrate top views of the take-up reel of FIG. 1 as the leader block is progressively received therein.
Figure 6:
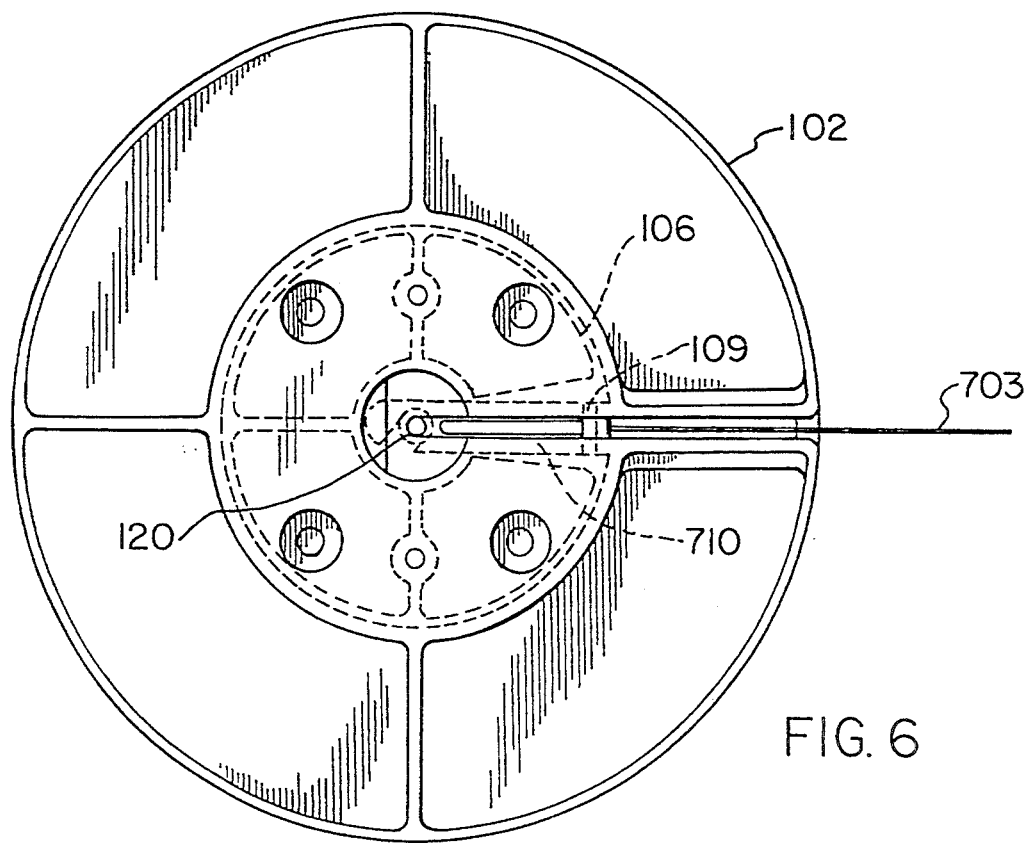

FIGS. 3–6 illustrate additional views of take-up reel 100 with leader block 700 in various positions in progressively traversing the length of the guide slots 104, 105. In particular, FIGS. 3 and 5 illustrate perspective and top views, respectively, of leader block 700 positioned at aperture 107 in hub 106 while FIGS. 4 and 6 illustrate perspective and top views, respectively of leader block 700 seated within aperture 107. As can be seen from these figures, aperture 107 includes shoulder 109 that engages guide projections 709 on leader block 700 to precisely determine the extent of radial travel of leader block 700 in guide slots 104, 105. Therefore, threading pin 120 is not the leader block final position determining element since it simply draws leader block 700 toward axially located pivot point 108 until the motion of leader block 700 is terminated by guide projections 709 encountering shoulder 109 of hub 106.

It is expressly understood that the claimed invention is not to be limited to the description of the preferred embodiment but encompasses other modifications and alterations within the scope and spirit of the inventive concept.

I claim:

1. A take-up reel apparatus for a tape drive comprising:
   a hub having a substantially cylindrical shape, and having a first end and a second end;
   a first plate having a substantially cylindrical shape, and having a top surface and a bottom surface, wherein said bottom surface of said first plate is connected to said first end of said hub to render said hub and said first plate cylindrically concentric;
   a second plate having a substantially cylindrical shape, and having a top surface and a bottom surface, wherein said top surface of said second plate is connected to said second end of said hub to render said hub and said second plate cylindrically concentric;
   wherein said hub includes an aperture in its cylindrical surface, extending substantially from said first end to said second end thereof, wherein said aperture is of dimensions to receive a leader block attached to one end of a magnetic tape;
   said first plate having a guide channel formed in its bottom surface extending radially outward from said aperture to an edge of said first plate, wherein a tape threading arm threading pin engages said leader block to place said leader block into said aperture, said first plate further comprises a threading pin slot formed therein and extending through said first plate from said guide channel to said top surface to enable said threading pin to transport said leader block radially from said edge of said first plate to said aperture, said guide channel being dimensioned to receive said leader block and said threading pin slot being dimensioned to only receive said tape threading arm threading pin; and
   said second plate having a guide channel formed in its top surface extending radially outward from said aperture to an edge of said second plate and being radially aligned with said guide channel in said first plate.

2. The take-up reel apparatus of claim 1 wherein said guide channels on said bottom surface of said first plate and on said top surface of said second plate extend substantially to a center pivot point of said first plate and said second plate and said threading pin slot extends substantially to said center pivot point of said first plate.

3. The take-up reel apparatus of claim 1 wherein said guide channel of said first plate is tapered, narrowing in width along its length toward said hub, to compensate for misalignment of said leader block with said guide channel.

4. The take-up reel apparatus of claim 1 wherein said aperture is tapered, narrowing in width along its length toward an axis of said hub, to compensate for misalignment of said leader block with said aperture.

5. The take-up reel apparatus of claim 1 wherein said aperture is of dimensions to engage a stop projection on said leader block to thereby precisely position said leader block when said leader block is inserted in said aperture.

6. The take-up reel apparatus of claim 5 wherein a side of said leader block, when said leader block Is seated in said aperture as regulated by said stop projection, forms a substantially continuous surface with said cylindrical surface of said hub to provide an uninterrupted cylindrical surface on which to wrap said magnetic tape.

7. The take-up reel apparatus of claim 1 wherein said guide channel on said bottom of said first plate and on said top of said second plate are of dimensions to match mating projections on a top side and a bottom side, respectively of said leader block.

8. A take-up reel adapted to receive leader block that is attached to one end of a magnetic tape, comprising:
   a spool, having a substantially cylindrical hub and first and second substantially cylindrical rims, On which said magnetic tape is wound;
   an aperture formed in the cylindrical surface of said hub to receive said leader block; and
   guide channels formed in the surfaces of said first and second rims that face each other, extending radially outward from said aperture to an edge of said first and second rims to guide said leader block from said edge to said aperture, wherein a tape threading arm threading pin engages said leader block to place said leader block into said aperture, said first rim further comprises:
   threading pin slot formed in said guide channel and extending through said firm rim to enable said threading pin to transport said leader block radially from said edge of said first rim to said aperture, said guide channel being dimensioned to receive said leader block and said threading pin slot being dimensioned to only receive said tape threading arm threading pin.

9. The take-up reel of claim 8 wherein said guide channels extend substantially to a center pivot point of said spool and said threading pin slot extends substantially to said center pivot point of said spool.

10. The take-up reel of claim 8 wherein said guide channel of said first rim is tapered, narrowing in width alone its length toward said hub, to compensate for misalignment of said leader block with said guide channel.

11. The take-up reel of claim 8 wherein said aperture is tapered, narrowing in width along its length toward a center pivot point of said spool, to compensate for misalignment of said leader block with said aperture.

12. The take-up reel of claim 10 wherein said aperture is of dimensions to engage a stop projection on said leader block to precisely position said leader block when said leader block is inserted in said aperture.

13. The take-up reel of claim 12 wherein a side of said leader block, when said leader block is seated in said aperture as regulated by said stop projection, forms a substantially continuous surface with said cylindrical surface of said hub to provide an uninterrupted cylindrical surface on which to wrap said magnetic tape.

14. The take-up reel of claim 8, wherein said guide channel on said first rim and on said second rim are of dimensions to match mating projections on a top side and a bottom side, respectively of said leader block.

* * * * *

UNITED STATES PATENT AND TRADEMARK OFFICE
CERTIFICATE OF CORRECTION

PATENT NO.    :   5,443,220

DATED         :   August 22, 1995

INVENTOR(S)   :   HOGE, KONSHAK, RAMBOSEK

It is certified that error appears in the above-identified patent and that said Letters Patent is hereby corrected as shown below:

On title page,

Item [73] change as follows:

--Assignees:   Storage Technology Corporation,
               Louisville, Colorado
               Minnesota Mining & Manufacturing Company,
               Saint Paul, Minnesota--

Signed and Sealed this

Third Day of December, 1996

Attest:

BRUCE LEHMAN

*Attesting Officer*       *Commissioner of Patents and Trademarks*